(12) United States Patent
Van Der Laan

(10) Patent No.: US 12,439,860 B2
(45) Date of Patent: Oct. 14, 2025

(54) EXTENDABLE PLANT TRAY ASSEMBLY

(71) Applicant: Crea-Tech International B.V., Aalsmeer (NL)

(72) Inventor: Paulus Maria Van Der Laan, Ter Aar (NL)

(73) Assignee: Crea-Tech International B.V., Aalsmeer (NL)

( * ) Notice: Subject to any disclaimer, the term of this patent is extended or adjusted under 35 U.S.C. 154(b) by 651 days.

(21) Appl. No.: 17/698,882

(22) Filed: Mar. 18, 2022

(65) Prior Publication Data

US 2022/0330491 A1 Oct. 20, 2022

Related U.S. Application Data

(60) Provisional application No. 63/201,215, filed on Apr. 19, 2021.

(51) Int. Cl.
*A01G 9/04* (2006.01)
*A01G 9/08* (2006.01)

(52) U.S. Cl.
CPC ............. *A01G 9/045* (2013.01); *A01G 9/088* (2013.01)

(58) Field of Classification Search
CPC ........ A01G 9/045; A01G 9/088; A01G 9/027; A01G 9/0295; A01G 9/0297
See application file for complete search history.

(56) References Cited

U.S. PATENT DOCUMENTS 4,476,651 A * 10/1984 Drury ................... A01G 31/042
47/65
4,528,774 A * 7/1985 Skaife ....................... A01G 9/02
47/81

(Continued)

FOREIGN PATENT DOCUMENTS

CA  2239739 A1 * 12/1999  ............. A01G 9/028
EP  0477064  3/1992

(Continued)

OTHER PUBLICATIONS

Tobinice "10 Pairs of 22 inch Soft Closed Drawer Slides . . . " <https://www.amazon.com/dp/B099KLWBM8/ref=sspa_dk_detail_1?pd_rd_i =...> (Year: 2021).*

(Continued)

*Primary Examiner* — Morgan T Jordan
(74) *Attorney, Agent, or Firm* — Quarles & Brady LLP

(57) ABSTRACT

An extendable plant tray assembly comprising a plurality of plant holders in a grid structure, wherein in a first direction said plant holders are movably connected through an extension system arranged to move said assembly between a retracted position and an extended position, the assembly including at least one grid structure element holding a plurality of plant holders in a second direction transverse to said first direction, wherein the plurality of plant holders are arranged on the at least one grid structure element in a staggered manner, alternating a plant holder with a plant holder receiving space, wherein the extension system comprises extendable connection members which are configured to connect at least two grid structure elements, and wherein the extendable connection members are detachably connected to said at least two grid structure elements.

22 Claims, 12 Drawing Sheets

(56) References Cited

U.S. PATENT DOCUMENTS

| | | | | |
|---|---|---|---|---|
| 8,245,443 B1 * | 8/2012 | Caruso | ................... | A01G 9/023 |
| | | | | 211/85.23 |
| 2012/0066970 A1 * | 3/2012 | Contillo, III | ........... | A01G 9/045 |
| | | | | 47/86 |
| 2015/0082697 A1 * | 3/2015 | Cantolino | ................ | A01G 9/02 |
| | | | | 47/79 |
| 2015/0135592 A1 * | 5/2015 | Lin | ...................... | A01G 9/0295 |
| | | | | 47/86 |
| 2015/0319946 A1 * | 11/2015 | Center | ................... | A01G 31/02 |
| | | | | 47/62 R |
| 2021/0105954 A1 * | 4/2021 | Cardenas | ................ | A01G 9/025 |
| 2021/0195853 A1 * | 7/2021 | Barnes | ................. | A23N 15/045 |
| 2022/0071103 A1 * | 3/2022 | Venderbosch | ......... | A01G 9/027 |

FOREIGN PATENT DOCUMENTS

| | | | | |
|---|---|---|---|---|
| EP | 3445157 | | 2/2019 | |
| FR | 2696162 | | 1/1994 | |
| NL | 2016632 | | 7/2017 | |
| WO | WO-2016195472 A1 * | 12/2016 | ............. | A01G 31/02 |
| WO | WO-2017-183969 | | 10/2017 | |

OTHER PUBLICATIONS

International Search Report & Written Opinion, International Application No. PCT/NL2017/050245, dated Oct. 7, 2018, 7 pages.
International Preliminary Report on Patentability, International Application No. PCT/NL2017/050245, dated Oct. 23, 2018, 6 pages.

* cited by examiner

EXTENDABLE PLANT TRAY ASSEMBLY

CROSS-REFERENCES TO RELATED APPLICATIONS

This application claims priority to provisional U.S. Patent Application Ser. No. 63/201,215, filed Apr. 19, 2021, entitled, "Extendable Plant Tray Assembly" the disclosure of which is incorporated herein by reference in its entirety for all purposes.

TECHNICAL FIELD

The invention relates to an extendable plant tray assembly. The invention further relates to a method for making an extendable plant tray assembly. Furthermore, the invention relates to a plant tray system. Also, the invention relates to a method for producing plants.

BACKGROUND

In a controlled agriculture environment, plants are typically produced in relatively large quantities using multiple plant containers, trays or pots placed in a grid arrangement. It is often required to be able to change the distance between maturing plants in a controlled environment agriculture, such that the available space can be more efficiently used. Often, spacing is accomplished through the use of labor, because of the high costs involved with complex solutions (e.g. automated robotic systems).

A large number of such plant holders may be arranged in a predetermined formation, for instance in parallel rows. Typically, the plant holders are separated from one another, on demand, according to the growth of the plants. The plant holders may for instance initially be placed closely spaced in order to maximize the number of pots on a given surface. When the plants grow bigger, they need to be spaced-apart to provide the adequate space, light and air to the plants. In a common method for spacing apart growing plants on a plant holder, one plant out of two adjacent plants is picked out in every row, and placed on a second plant holder. This can be done manually or mechanically. In both cases, it is experienced to be a time-consuming activity, during which the growing plants run the risk of being damaged due to the handling, lifting and/or moving of the plants.

Extendable plant tray assemblies are known in the art. Such systems may reduce the labor requirements by effectively increasing the automation of re-spacing of the plant holders. Such assemblies typically employ connectors, bars and bases to obtain an expandable plant holder arrangement. Generally, the assemblies are spaced out in one direction. When growing seedlings and plants increase in volume by growing leaves, branches and/or flowers, increasingly more space is needed, e.g. for receiving light, water, air, and the like, around each plant holder in which a plant is grown. Such expandable assemblies enable increasing the distances between the plant holders such as to decrease the number of plant holders per unit of area or volume, albeit only in one direction, while not providing additional space around the whole plant.

The installation of expandable assemblies may be challenging since the dimensions may be relatively large. The extendable plant tray assemblies are typically installed as a whole. They can be very difficult to adapt, for example to shrink or to expand. Such operation may be hindered by the arrangement allowing the assembly to expand and contract between different positions.

The assemblies are also often rather expensive to manufacture, as a custom/dedicated design may be required. The custom design may be based on the space available, e.g. the size of the base or table on which the assembly is to be positioned.

Furthermore, transportation of such assemblies is difficult, as requiring a lot of effort to dismantle. The structures are often very large to be transported at once. Additionally, the structure may be heavy, especially when it is holding plants, making certain manipulations and/or displacements more difficult or even impossible. Dismantling or assembling the assembly on-site may be too time consuming or costly.

The present invention is directed toward overcoming one or more of the problems discussed above.

SUMMARY OF THE EMBODIMENTS

It is an object of the invention to provide for a method and a system that obviates at least one of the above mentioned drawbacks.

Additionally or alternatively, it is an object of the assembly which is easier to construct.

Additionally or alternatively, it is an object to provide an extendable plant tray assembly providing better manufacturing flexibility, especially for custom designs.

Additionally or alternatively, it is an object of the invention provide for an extendable plant tray assembly which has a better customizable design.

Additionally or alternatively, it is an object of the invention to provide for a more efficiently designed extendable plant tray assembly.

Additionally or alternatively, it is an object of the invention to provide for an improved extensions system for the extendable plant tray assembly.

Additionally or alternatively, it is an object of the invention to provide for an extendable plant tray assembly which reduces the time needed for the spacing apart of plants.

Thereto, the invention provides for an extendable plant tray assembly comprising a plurality of plant holders in a grid structure, wherein in a first direction said plant holders are movably connected through an extension system arranged to move said assembly between a retracted position and an extended position, the assembly including at least two grid structure elements holding a plurality of plant holders in a second direction transverse to said first direction, wherein the plurality of plant holders are arranged on the grid structure elements in a staggered manner, alternating a plant holder with a plant holder receiving space, wherein the extension system comprises extendable connection members which are configured to connect the at least two grid structure elements, and wherein the extendable connection members are detachably connected to said at least two grid structure elements.

Advantageously, the extension system provides significantly improved design flexibility. The extension system can be adjusted where needed as the extendable connection members are detachably connectable to the at least two grid structure elements. The extendable plant tray assembly can be easily assembled and installed. Furthermore, a modular design is obtained by means of the detachable connection members. In this way, a custom design can be easily assembled. Moreover, an existing design can be easily changed, e.g. expanding of the assembly with addition grid structure elements, for example by re-arranging, adding and/or removing one or more extendable connection members. The extendable connection members can be easily detachable from the grid structure elements.

The assembly according to the invention enables spacing the plant holders simultaneously in two directions by means of movement in one direction.

The grid structure element may be configured to hold a plurality of plant holders in various ways. In some examples, adjacent plant holders held by the grid structure element are coupled by means of coupling pieces. It is also possible that the grid structure element includes a rib to which the plurality of plant holders are arranged in a staggered manner. In some examples the extendable connection members are attachable to the grid structure elements at the coupling pieces. The coupling pieces may be embodied as slots connecting the plant holders, or as bridge elements connecting the plant holders, or as a rib structure element to which the plant holders are connected, etc. Many embodiments of a coupling piece are possible.

Optionally, the extendable connection members are detachably connectable to said at least two grid structure elements by means of a snap-fit connection.

Advantageously, the extendable connection members can be easily attached to dedicated positions of the grid structure elements. This may for instance be achieved a clicking coupling mechanism. In this way, the extendable connection members of the extension system can be easily clicked in position where desired. For example, depending on the situation, e.g. taking into account the total weight of the assembly, it is possible to further expand the extension system by providing additional connections between the grid structure elements.

The snap-fit extendable connection members can be easily clicked in at any desired position on dedicated connection locations of the grid structure elements. The dedicated connection locations may be slots, holes, protrusions, etc.

The grid structure elements may have dedicated connection parts, at which the connection members can be attached. It is possible to easily detach the connection members from the dedicated connection parts, if desired. The dedicated connection parts may for instance be holes in which a part of the connection members can be inserted for enabling a detachable connection. The holes may for instance be arranged at one or more corners of the plant holders.

Optionally, each grid structure elements comprises a plurality of slots to which one end of the extendable connection members is attachable.

The slots may form openings configured and dimensioned to receive a mechanical part of the extendable connection members for achieving an attachment. However, the mechanical part may be configured such as to allow detachment if desired.

Optionally, the extendable members are attachable to the grid structure elements by pushing interlocking components together in the slots of the grid structure elements.

The interlocking components may be configured to prevent detachment during normal use of the assembly, for instance when extending the assembly from the retracted position to the extended position. If needed, the interlocking components can be released resulting in a detachment of the extendable connection member. This action may be performed easily using a snap-fit mechanism. Optionally, no tools are required for detaching the extendable connection members from the grid structure elements.

Optionally, the plurality of slots are positioned between adjacent plant holders arranged on the grid structure elements.

The slots may be arranged at regular locations on the grid structure elements.

Optionally, the plurality of slots are arranged between connected portions of adjacent plant holders arranged on the grid structure elements.

In some examples, the slots are formed by the portions of the grid structure elements which connect the plurality of plant holders.

Optionally, the extension system is a slidable extension system.

A sliding mechanism may provide a reliable way to adjust a distance between neighboring grid structure elements of the assembly.

Optionally, the slidable extension system comprises at least one telescopically extendable rod connecting at least two grid structure elements.

The telescopically extendable rod is detachably connected to the grid structure elements.

The extension system may provide for a telescopic extension system which is detachably connectable to at least two grid structure elements. The telescopic extension system may have a telescopic guide member, for instance forming a guiding hole in which one or more bars can slide. The telescopic guide member may be also detachably connectable to dedicated parts of the grid structures.

Optionally, the assembly comprises a plurality of extendable connection members, wherein at least two extendable connection members have different lengths.

Optionally, a first extendable connection member in the assembly is longer than a second extendable connection member in the assembly. Such a longer first extendable connection member may locally enhance the structural stability of the assembly. Optionally, the first extendable connection member extends over a (total) length of the assembly.

Optionally, outer extendable connection members arranged along sides of the assembly are longer than other extendable connection members in the assembly. Advantageously, the structural stability can be significantly enhanced. This can also provide more design freedom for the other extendable connection members. For example, at least one of the extendable connection members is longer than other extendable connection members, such as an outer extendable connection member can be longer than other extendable connection members, or a central extendable connection member can be longer, or three or more extendable connection members. Alternatively, all extendable connection members are equally long.

Optionally, the assembly comprises only one outer extendable connection member at each of the two sides of the assembly.

Optionally, the outer extendable connection members extend continuously over a length of the assembly. The outer extendable connection members may span over a total length of the assembly.

Optionally, the extendable connection member comprises at least a first connection unit and a second connection unit, wherein the first and second connection units are configured to be attachable to dedicated portions of the grid structure elements.

The dedicated portions may be slots, and the connection units may be protrusions, or vice versa.

Optionally, the extendable connection member comprises a first beam on which the first connection unit is arranged and a second beam on which the second connection unit is arranged, the first and second connection units detachably connectable to the grid structure elements, wherein the extendable connection member comprises a sliding guiding member which is arranged to enable sliding of the first and second beams with respect to each other in a longitudinal direction thereof.

The sliding guiding member may be detachable from the first connection unit and the second connection unit. In some examples, the extendable connection member is a telescopic arrangement comprising at least three parts, namely, the first connection unit, the second connection unit, and the sliding guiding member. In some examples, the sliding guiding member may not be required, for instance, the first connection unit may have a receiving portion in which an end of the second connection unit can be received. Other embodiments are also envisaged.

The beams may be rigid rods or bars and can have various shapes.

The extension system may have a retaining member for limiting the maximum extension of the extendable connection members.

Optionally, the sliding guiding member comprises a third connection unit detachably connectable to one of the grid structure elements of the assembly.

The extendable connection member may have at least three connection points, resulting in a more stable connection. It is also possible to use a plurality of sliding guiding members, resulting in even more connection points. Additionally or alternatively, it is also possible that the first connection unit and/or the second connection unit has more than one connection point, for example at least a first connection point for detachable connection to a first grid structure element, and a second connection point for detachable connection to a second grid structure element, preferably neighboring the first grid structure element.

Optionally, the assembly includes at least one grid structure end element, arranged to be located at an end position of said assembly in said first direction, comprising a central rib in said second direction, wherein plant holders are only mounted to a single side of said rib, alternating a plant holder with a plant holder receiving space, wherein the extendable connection members are detachably connected to said at least one grid structure end element.

The extendable plant tray assembly may have regular modules (i.e. at least two grid structure elements) and one or more end modules arranged at the end(s). For example, the regular modules may be arranged between the end modules, providing a rectangular shape. However, it is also possible to use only regular modules, which may result in a teethed arrangement of plant holders at the end, as a result of the staggered arrangement. It is also possible to use an end module at one end only. Various different embodiments are possible.

Optionally, the assembly includes two grid structure end elements, in between which at least one grid structure element is located.

The extension system may effectively enable to shift the grid structure elements with respect to each other. The extendable connection members may have extension arms connected to at least two grid structure elements. By means of the extendable connection members, a relatively movable connection is provided between the at least two grid structure elements, so that their distance and thus the spacing of the plant holders can be variable.

Optionally, the plant holders have sloping walls.

Advantageously, the plants and medium within the plant holders may be removed easily in this way. The plant holders may have chamfered walls.

Various plant growth mediums can be employed. The medium can be any material or composition in which the plants can grow, for instance soil, rock wool, paper, bark, coconut fiber, compost, etc.

Optionally, the plant holders are tapered towards the bottom side.

The chamfered walls may be tapered towards the bottom side, thereby enabling a more easy removal of the plants/medium housed in the plant holders.

Optionally, a distance between diagonally adjacent plant holders remains unchanged between said retracted position and said extended position of said assembly.

In the retracted position, the grid structure elements are pushed closer together. In the extended position, the grid structure elements are pushed farther apart, wherein the plant holders are more distributed with empty spaces therebetween.

In the retracted position, the plant holders may be arranged in a rectangle configuration with respect to each other. In the extended position, the plant holders may be distributed such that the upper side of the assembly is divided into alternating plant holders and empty spaces (like a chessboard).

Optionally, a size of said plant holder receiving space corresponds to a size of an adjacent plant holder.

The grid structure elements may have plant holders disposed in such way that, in the retracted position, the plant holders of neighboring grid structure elements interlock, such that the plant holders are as close as possible to one another, with limited free space between the plant holders. In the retracted position the plant holders may mesh or fit together, whilst in the extended position the plant holders are more distributed with empty spaces therebetween.

Optionally, the plant holder includes a bottom surface, with at least one hole.

The holes in the corners may facilitate air and/or water reaching the plant roots. Additionally or alternatively, the hole may enable pushing out the medium and/or plant out of the plant holder if needed.

Optionally, the bottom surface comprises one or more protrusions to lift the bottom surface in order to allow water and/or air to access the at least one hole.

The protrusions may form legs enabling air to easily reach the holes arranged on the bottom surface of the plant holders.

Optionally, the plant holder includes a larger central hole on the bottom surface, surrounded by multiple adjacent smaller holes.

Optionally, the bottom surface has at least one hole configured such that an actuation pushing member can pass therethrough such as to push the plant and/or medium out of the plant holder. The central hole may be dimensioned such as to enable easy removal of the plant and/or medium from the plant holder. In some examples, a robotic arrangement is employed configured to simultaneously push multiple plants out of the plant holder using a plurality of actuation pushing members. The actuation pushing member may be configured to punch/push all the medium of the plants at once out of the plant holder. In some examples, the assembly is first orientated upside down. However, it is also envisaged that the medium/plants in the plant holders are first loosened using the actuation pushing members, and the assembly is subsequently tilted in order to remove the medium/plants from the plant holders. It will be appreciated that the removal may also be performed manually.

Optionally, a stamping system is employed for automatically pushing a plurality the plants/medium out of the plant holders through the central hole. The plants/medium can then be easily picked up and/or removed from the plant holders. In some examples, the stamping system includes a table with a plurality of stamps that are correspondingly configured with respect to the central holes of the plant holders of the assembly.

Optionally, the smaller holes are located near the edges of the bottom surface.

The smaller holes may facilitate air/water reaching the medium and the roots of the plant.

Optionally, the at least two grid structure elements and/or said grid structure end element are modular elements, to which a desired number of plant holders is mountable.

Such a modular design provides significant advantages. The configuration of the extendable connection members which are detachably connected to the at least two grid structure elements can be easily chosen. The assembly can be easily expanded with additional grid structure elements by means of the extendable connection members. The modular design of the assembly according to the invention may provide for significant design flexibility, which is often required in a controlled agriculture environment.

Optionally, extendable connection members are injection-molded elements.

Optionally, the extension system comprises a locking mechanism, wherein the assembly can be locked in at least the first position (i.e. retracted position), preferably in the first position and the second position (i.e. extended position).

Optionally, the grid structure elements are movable between the first and second position in a direction which is substantially transverse to a longitudinal direction of at least one of said grid structure elements. Advantageously, the extendable connection member may be a detachable connecting mechanism allowing the movement between the first and second position. In some examples, the extendable connection members are configured to allow a sliding movement of at least one of said grid structure elements (cf. column of plant holders in staggered formation) relative to at least one further grid structure element. In some examples, the extendable connection members enable movement in a straight line. The plurality of grid structure elements may have a parallel longitudinal axis, both in the first and the second position.

The grid structure elements may have a series of compatible coupling portions to which the extendable connecting members can be coupled. The coupling portions and the extendable connection members are configured such as to allow coupling and uncoupling (i.e. detachable connection).

Optionally, the assembly further includes a handle for manually operating the device.

According to an aspect, the invention provides for a method of making a plant tray assembly extendable in a first direction, the method comprising: providing a plurality of plant holders in a grid structure, wherein at least one grid structure element is provided which is configured to hold a plurality of plant holders in a second direction transverse to said first direction, wherein the plurality of plant holders are arranged on the grid structure elements in a staggered manner, alternating a plant holder with a plant holder receiving space; providing an extension system configured to enable movement of the plant tray assembly in the first direction between a retracted position and an extended position, the assembly; and connecting at least two grid structure elements with an extendable connection member, the extendable connection member being detachably connected to the at least two grid structure elements.

Advantageously, the extension system is not integral with the grid structure elements. The extendable connection members can be selectively attachable to the grid structure elements, providing an advantageous modular design.

The extendable connection members may be slid between the retracted position and the extended position, enabling a variable distance between the grid structure elements. In this way, the plant holders can be (evenly) distributed with varying empty spaces therebetween.

Optionally, the size of the plant tray assembly is expanded or reduced by changing the number of grid structure elements used, and wherein the connection between grid structure elements is correspondingly adjusted using the detachable extendable connection members.

The invention provides for a more custom design in an advantageous way.

Advantageously, the configuration of the assembly can be easily adapted or changed, by attachment or detachment of extendable connection members as desired. In this way, an existing assembly can be easily repurposed for a different plant production batch.

The medium can be put directly into the plant holders. Each grid structure element may have a monolithic design, for example made of a plastic. The assembly can be easily expanded by using a larger number of grid structure elements connected to each other by means of the extendable connection members. The size of the assembly can also be easily reduced by removing some of the grid structure elements by correspondingly detaching some of the extendable connection members.

Optionally, the assembly is placed on a base, for example a frame or table. The base may have a meshed or slotted surface through which air can access the assembly (and thus the plants) from underneath. Air can thus be blown between the plant holders in an upward direction along the plant holders, from underneath the plant holders upwardly to ventilate the plants in the plant holders. For example, the assembly can be placed on a frame, a table, or gutters having openings through which air can be vented towards the plant holders from a bottom side of the plant holders upwardly.

Optionally, the assembly has an upper side and a bottom side, wherein the extendable connection members are configured to be attachable to the grid structure elements from the bottom side. Alternatively, they can be attachable to the grid structure elements from the top side, or from the top side and from the bottom side.

Advantageously, in the retracted position, the trays may be positioned closer together with respect to each other, as the extendable connection members are arranged from the lower side, rather than arranging the extendable connection members in between the grid structure elements.

The upper side may correspond to the side which in use is intended to face upwards, cf. the side on which the plants in the plant holders are to be grown. The lower side may correspond to the side which in use is intended to face downwards.

Optionally, at least one subset of the extendable connection members are configured to comprise at least two connection points, more preferably at least three connection points. In some examples, a larger number of connection points are provided for each of the extendable connection members in said at least one subset. For example, it is envisaged that at least some extendable connection members have five connection points, for example obtained by means of two end guides and three intermediate beams. Various different configurations are possible. It is also envisaged that different subsets of extendable connection members with a different number of connections points are employed. Different types of connection units can be used for providing the connection points.

According to an aspect, the invention provides for a plant tray system comprising: an extendable plant tray assembly comprising a plurality of plant holders in a grid structure, wherein in a first direction said plant holders are movably connected through an extension system arranged to move said assembly between a retracted position and an extended position, the assembly including at least one grid structure element holding a plurality of plant holders in a second direction transverse to said first direction, wherein the plurality of plant holders are arranged on the grid structure elements in a staggered manner, alternating a plant holder with a plant holder receiving space, wherein the extension system comprises extendable connection members which are configured to connect at least two grid structure elements, and wherein the extendable connection members are detachably connected to said at least two grid structure elements; and a base on which the extendable plant tray assembly is placeable, wherein the base comprises a plurality of gutters arranged in parallel next to each other extending in the first direction.

The gutters and the assembly may be correspondingly designed in order to enable placement of the assembly on the gutters. In some examples, the assembly and the gutters are dimensioned such as to allow one row of plant holders in each gutter. It is also envisaged that a different number of rows of plant holders are placed in each gutter, e.g. a pair of two plant holders placed within one gutter.

A small gap may be provided between the parallel gutters so that air blown through the gutters can easily flow upwards. Optionally, the gap is in a range of two to ten millimeters. In an advantageous example, the gap is five millimeters.

The assembly and the gutters may be configured such as to allow air to pass along the extension system. The air may flow at least partially along the extendable connection members upwards. Blowing the air through the gutters may be beneficial for the growth of the plants housed in the plant holders of the assembly. If the plants are too close together, moisture may remain and it can result in detrimental effects, for instance due to mold or fungus. Blowing air from the bottom of the plant, may result in an upwards airflow, so that detrimental moisture concentrations can be easily reduced.

In some examples, the gutters are arranged in a frame. It is also envisaged that the gutters are placed on a table. The gutters may be closed at the bottom surface, such that they can be used for watering the plants housed in the plant holders of the assembly. Advantageous, the leaves can remain dry thereby preventing development of fungus at the leaves of the plants.

It will be appreciated that the extendable tray assembly may also be placed on a surface of a table. The surface of the table may be meshed or may have a plurality of openings or slots. The surface may also be a surface without openings.

It will be appreciated that it is also envisaged that the gutters are not employed. For example, the tray assembly may be placed on a table without gutters. The water can then be given from above with a sprinkler for instance.

The plant holders may be formed on the grid structure elements according to a zigzag pattern. The plant holders may be disposed in a staggered arrangement in alternation with and on both sides of the grid structure element. The plant holders may be arranged in meandering positions along the longitudinal direction of the grid structure element. The plant holders may be regularly distributed along the length of the grid structure element. Optionally, the plant holders are integral with the grid structure element, forming a unitary part.

The assembly may be configured to support plant holders (e.g. plant pots) at a variable distance from each other, wherein the variable distance is obtained by displacing the grid structure elements with respect to each other using the extension system. The grid structure elements may be unitary with the plurality of plant holders integrated thereon. The plant holders may be disposed in a same horizontal plane.

Optionally, the gutters are sloping in order to allow the flow of water from one end to another end.

The gutters may be sloped slightly so that the water can flow in from one side and flow out from the other side. The assembly and the gutters may be dimensioned such that the bottom surface of the plant holders rest on the receiving surfaces of the gutters. Optionally, the protrusions on the bottom surface of the plant holders rest on the receiving surfaces of the gutters.

Optionally, the plant tray system further includes a ventilation unit, configured to blow air through the gutters.

The gutters can be used as a watering and air ventilation arrangement.

According to an aspect, the invention provides for a grid structure element for an extendable plant tray assembly, for example according to any of the preceding claims, the grid structure element arranged to hold a plurality of plant holders in a staggered manner, alternating a plant holder with a plant holder receiving space, wherein between each adjacent plant holder a slot is arranged to which one end of an extendable connection member is attachable.

According to an aspect, the invention provides for a grid structure end element for an extendable plant tray assembly, for example according to any of the preceding claims, the grid structure arranged to hold a plurality of plant holders only at a single side, alternating a plant holder with a plant holder receiving space, wherein between each adjacent plant holder a slot is arranged to which one end of an extendable connection member is attachable.

According to an aspect, the invention provides for an extendable connection member comprising at least a first connection unit and a second connection unit, wherein the first and second connection units are configured to be attachable to dedicated portions of a grid structure element and grid structure end elements according to the invention.

The extendable connection members may connect the plurality of grid structure elements, allowing a displacement of the grid structure elements in at least one direction.

The detachable extendable connection members provide important advantages related to design flexibility. The modular design provides for easy customization of the assembly.

Advantageously, such detachable extendable connection members are easy to manufacture. The extendable connection members may have a limited number of individual parts, facilitating the manufacturing thereof. Furthermore, it becomes easier to make a custom design of the assembly. For example, the configuration or arrangement of the plurality of extendable connection members can be chosen or even changed/adapted. In this way, the assembly can be easily custom designed whilst keeping the individual parts of the assembly properly together.

The sliding guiding member may be a middle element in which the first and second beams can slide. The sliding guiding member may for instance have a closed shape (e.g. round, rectangular, square, ring, etc. shape). The sliding guiding member may form an enclosing chamber through which the beams can be slidably positioned. In some examples, a stop element is provided in order to prevent the beams from leaving the sliding guiding member. The stop element may for instance be provided on the beams. However, other mechanical alternatives are possible.

A snap-fit connection may enable easy attachment of the extendable connection member. For instance, the extendable connection member can be clicked in position, by performing a manual pushing action.

According to an aspect, the invention provides for a method for producing plants, the method comprising: providing an extendable plant tray assembly comprising a plurality of plant holders in a grid structure, wherein in a first direction said plant holders are movably connected through an extension system arranged to move said assembly between a retracted position and an extended position, the assembly including at least one grid structure element holding a plurality of plant holders in a second direction transverse to said first direction, wherein the plurality of plant holders are arranged on the grid structure elements in a staggered manner, alternating a plant holder with a plant holder receiving space, wherein the extension system comprises extendable connection members which are configured to connect at least two grid structure elements, and wherein the extendable connection members are detachably connected to said at least two grid structure elements; filling the plant pots with medium, wherein a seed, seedling or plant is placed in the medium; providing a base on which the extendable plant tray is placeable, wherein the base comprises a plurality of gutters arranged in parallel next to each other extending in the first direction; placing the extendable plant tray assembly in retracted position on said base; extending the extendable plant tray assembly from the retracted position to its extended position based on a size of the plants.

Optionally, the base comprises a plurality of gutters. The gutters may be arranged to receive the plant tray assembly, wherein the plant tray assembly is extendable within the gutters.

Optionally, the base comprises a table with grooves.

Optionally, the base comprises a table with a mesh. The mesh may provide a plurality of openings through which air and water may flow.

Optionally, the base comprises a frame with gutters or grooves in which the plant tray assembly is placeable.

Optionally, a plurality of plant tray assemblies are employed.

Optionally, a part of the plant tray assemblies is replaced to create space.

Optionally, plants or plant parts are removed from the extendable plant tray assembly. Optionally, the plant tray assembly is cleaned and/or disinfected.

Optionally, the plant plots are re-filled with a medium, wherein a seed, seedling or plant is placed in the medium.

During the cultivation of the plants in the plant holders, the grid structure elements can be gradually moved from the retracted position to the extended position. After a cultivation period the assembly may be manipulated such that the grid structure elements are brought back to the first retracted position, after which the plant holders may be emptied. The plant holders may receive medium or a growth medium therein. A seed, seedling or plant may be planted in the plant holders.

Optionally, water is provided via the gutters.

Optionally, ventilation for the plants is provided by blowing air along slots or holes in the base of the plant holders and/or a gap between the gutters.

The air may be blown such as to reach and flow along the holes in the base of the plant holders. The air flowing along said holes in the base may provide adequate ventilation from the bottom of the plant holders. It is also envisaged that air is blown through the plants through the plant holders, which may also reach the holes in the base of the plant holders. The air may be blown through the gutters to flow along the holes. It is also possible that air can reach the holes in the base via meshes of the table, or an equivalent porous structure on which the assembly is placed.

The extendable plant tray assembly may be configured to support plant holders at a variable distance from one another using an extension system. A plurality of plant holders may be held inside a same horizontal plane, each of the plant holders being able to receive and support a plant. The plant holders may be disposed in alternate fashion on either side of the grid structure elements.

The extendable plant tray assembly may be reversibly extendable between at least a retracted position and a fully extended position. It will be appreciated that different types of extendable connection members may be used. For example, instead of employing sliding configurations, it is also envisaged that alternative mechanical arrangements are employed, for example a lazy tongue arrangement.

The plant holders may be cells or containers configured to receive a seed, a seedling and/or a plant. The plant holders may be configured to hold medium or growing material, such that the seed, seedling and/or plant is allowed to grow out of said plant holder. The assembly may be handled with all seeds, seedlings and/or plants growing thereon, and thereby allowing to varying the distance between plant holders when desired.

Optionally, the plant holders have rectangular opening. The plant holders may have various shapes. For example, the plant holders may have a cubical shape or cylindrical shape. Other shapes are also envisaged.

It will be appreciated that the assembly and system according to the invention can be used for growing different types of plants.

It will be appreciated that any of the aspects, features and options described in view of the assembly apply equally to the method and system. It will also be clear that any one or more of the above aspects, features and options can be combined.

BRIEF DESCRIPTION OF THE DRAWINGS

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
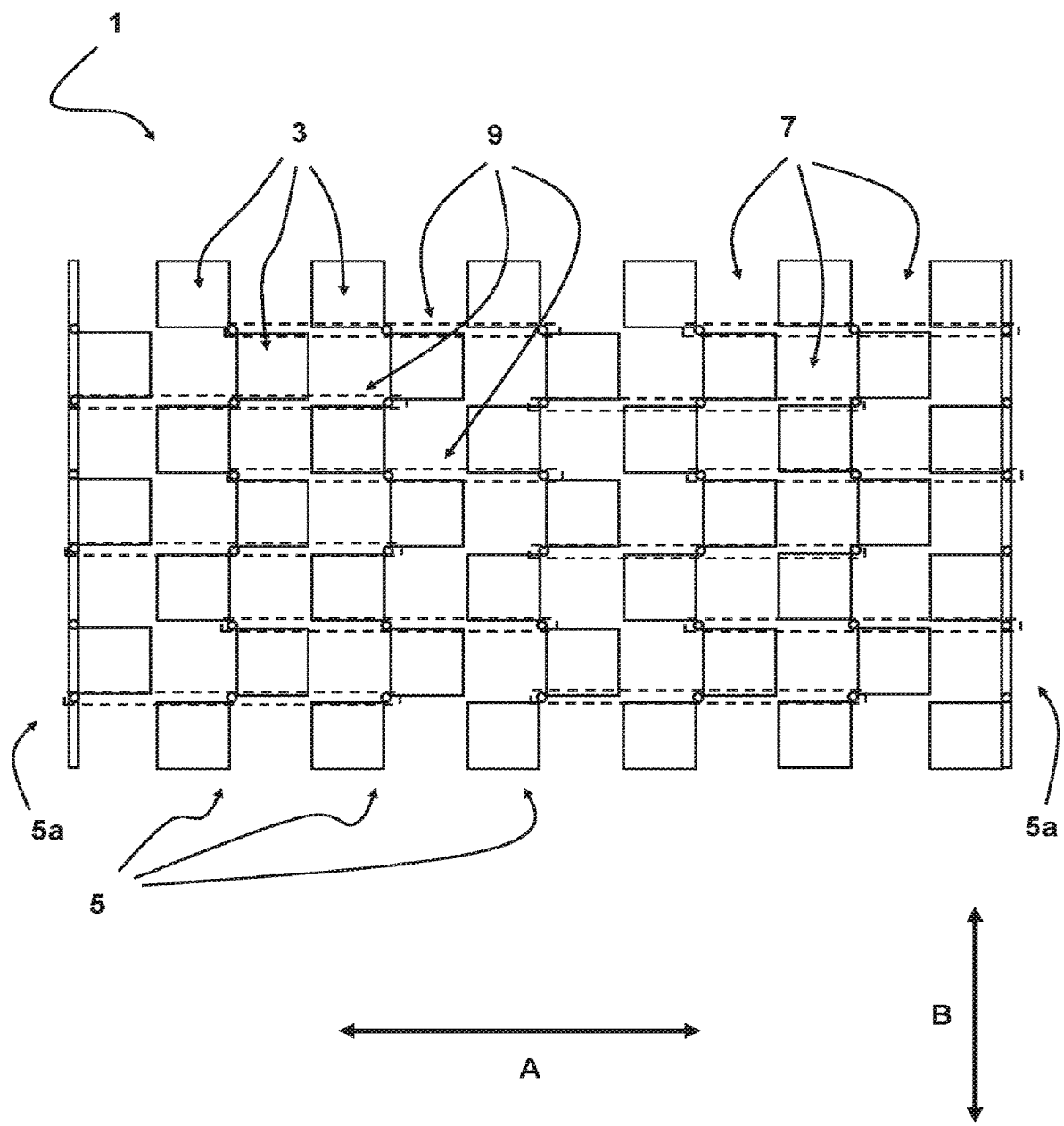
FIG. 1 shows a schematic diagram of an embodiment of an assembly.

FIG. 1 shows a schematic diagram of a top view of an embodiment of an extendable plant tray assembly 1. The extendable plant tray assembly 1 comprises a plurality of plant holders 3 in a grid structure, wherein in a first direction A said plant holders 3 are movably connected through an extension system arranged to move said assembly 1 between a retracted position and an extended position, the assembly including at least two grid structure elements 5 holding a plurality of plant holders 3 in a second direction B transverse to said first direction A, wherein the plurality of plant holders 3 are arranged on the grid structure elements 5 in a staggered manner, alternating a plant holder 3 with a plant holder receiving space 7, wherein the extension system comprises extendable connection members 9 which are configured to connect the at least two grid structure elements 5, and wherein the extendable connection members 9 are detachably connected to said at least two grid structure elements 5. In the shown example, the assembly is placed in the extended position.

Advantageously, a custom design of the extension system is significantly facilitated. It can be chosen how and where the extendable connection members 9 are arranged. Furthermore, an assembled assembly 1 with extendable connection members 9 can be easily adapted, for instance the extendable connection members can be re-arranged or re-positioned, a different number of extendable connection members may be arranged, some locations may be provided with additional extendable connection members, etc.

The extension system comprises a plurality of detachable extendable connection members. The extension system may be operable between a retracted position and an extended position such as to vary the mutual distance between the grid structure elements. In this way, the plant holders may be more distributed.

In the shown example, the assembly 1 comprises five grid structure elements 5. Two optional grid structure end elements 5a are provided at the ends of the assembly 1.

Figure 2:
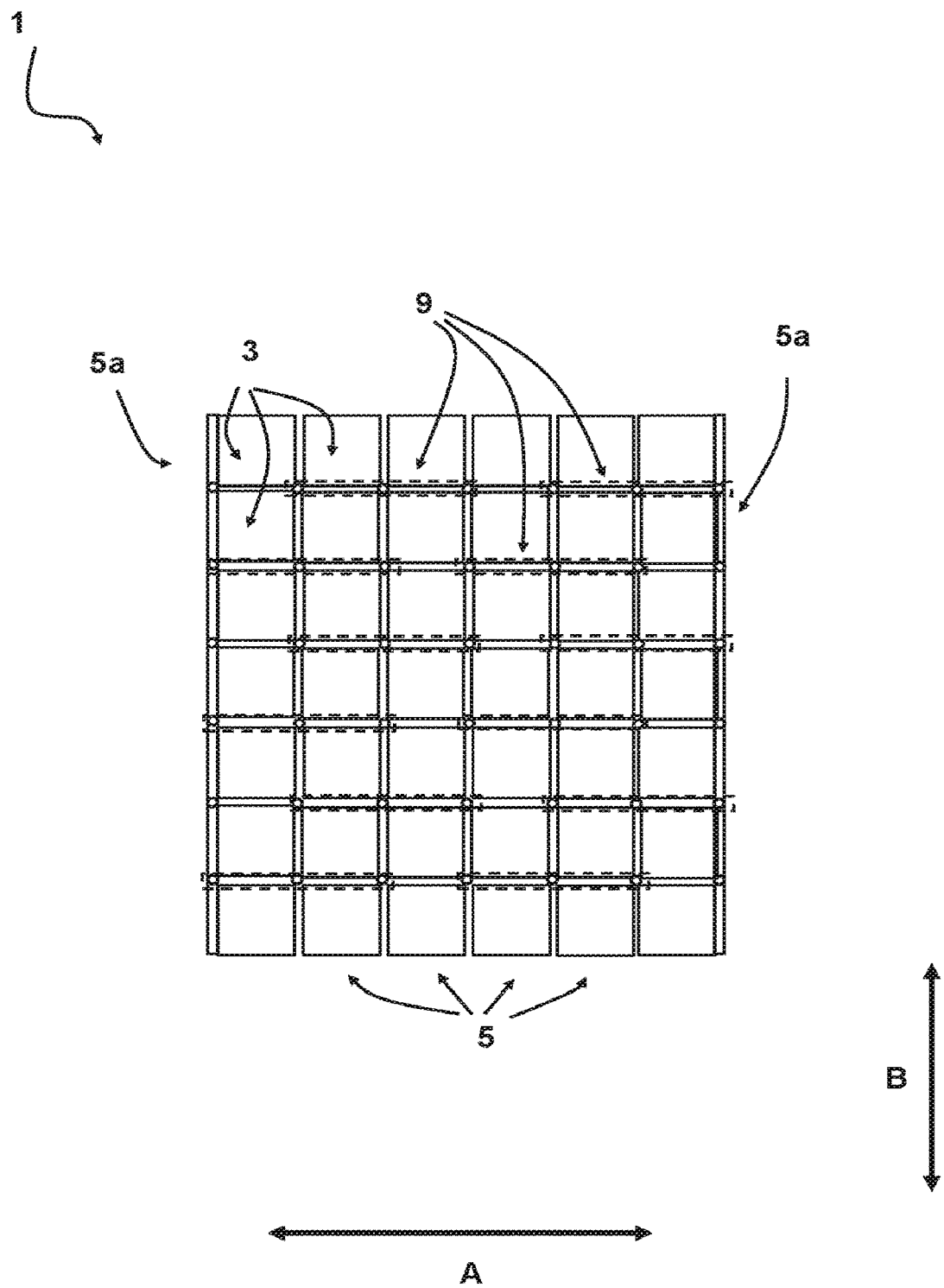
FIG. 2 shows a schematic diagram of an embodiment of an assembly.

FIG. 2 shows a schematic diagram of an embodiment of an assembly 1. In this shown example, the assembly is placed in the retracted position. Accordingly, the plant holders 3 are placed close to each other, without free spaces therebetween formed by the plant holder receiving spaces 7.

The assembly 1 may provide for expandable plant growing assembly with enhanced manufacturing flexibility. Its modular design makes it easy to assemble a custom design. The assembly can be further customized if needed by coupling/decoupling the extendable connection members. For instance, additional grid structure elements may be added and connected to other grid structure elements of the assembly by mounting additional extendable connection members connecting the additional grid structure elements to the assembly. Hence, the detachable connection members allow the assembly to be easily expanded with more plant holders. It is also possible to remove grid structure elements, and thus the number of plant holders. Also the stiffness of the structure can be changed by rearranging the extendable connection members.

Figure 3:
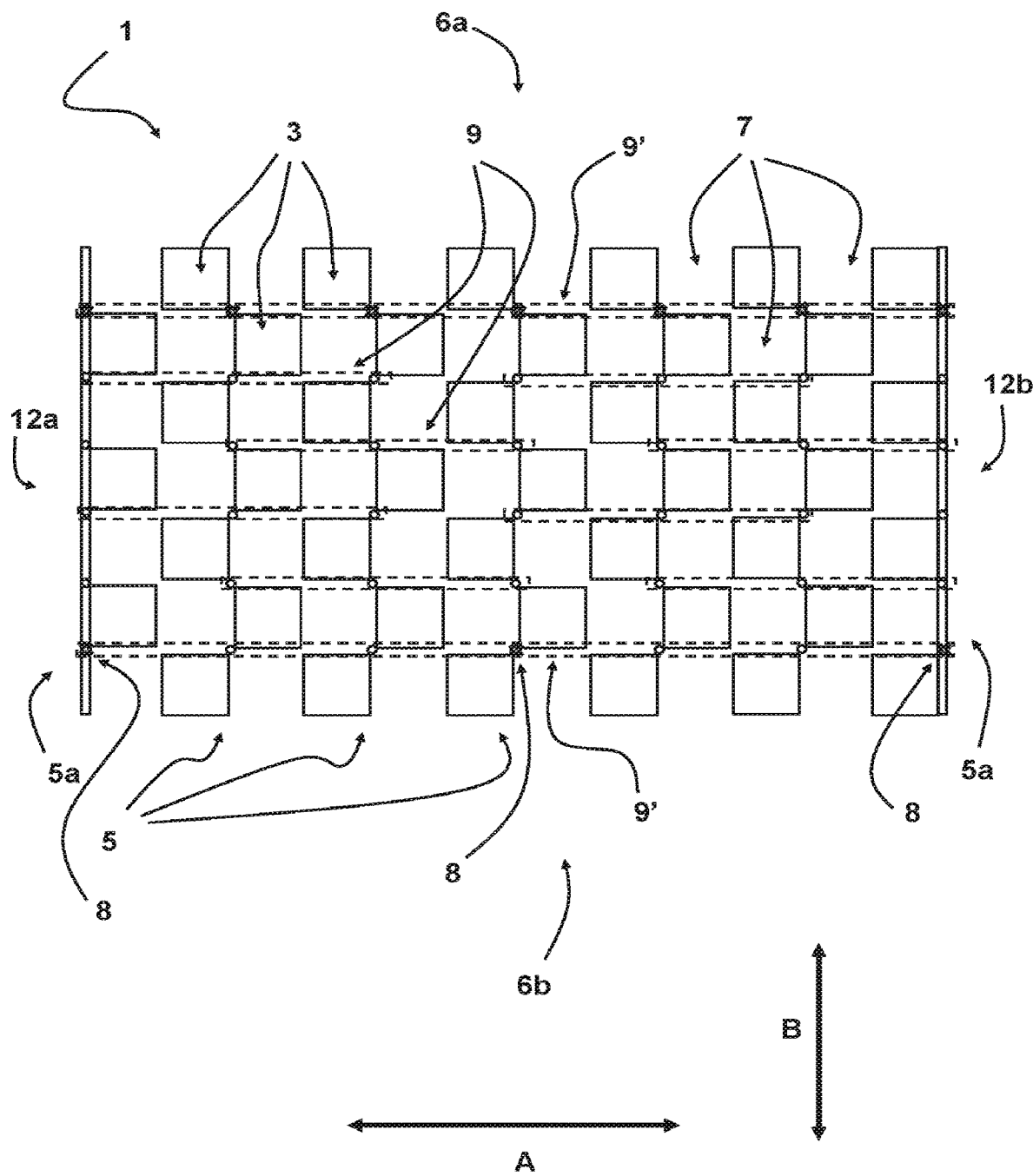
FIG. 3 shows a schematic diagram of an embodiment of an assembly.

FIG. 3 shows a schematic diagram of an embodiment of an assembly 1. The assembly 1 has a first end 12a and a second end 12b for which the relative distance can be varied by means of extension/retraction actions. The assembly has a first side 6a, a second side 6b. In FIG. 3, the assembly is placed in the extended position. In this shown example, the outer extendable connection members 9' which are positioned at sides the plant tray assembly 1 are longer than the other extendable connection members 9 employed in between the sides of the extendable plant tray assembly 1. The outer extendable connection members 9' may be continuously arranged over the total length of the plant tray assembly 1. Advantageously, the structural stability of the assembly 1 can be significantly enhanced in this way. Moreover, this may provide further design freedom for the other extendable connection members 9 which are not arranged at sides of the plant tray assembly 1.

The outer extendable connection members 9' may have a different number of connection points. For instance, in the shown example, one of the outer extendable connection members 9' extends over the total length of the extendable plant tray assembly 1, along direction A, but has only three connection points 8, which are marked by means of a cross. The other of the outer extendable connection members 9' also extends over the total length of the extendable tray assembly 1, along direction A, but has 7 connection points 8, also marked by means of a cross. A different number of connection points 8 is also possible. The connection points for the other extendable connection members 9 are not shown.

Figure 4:
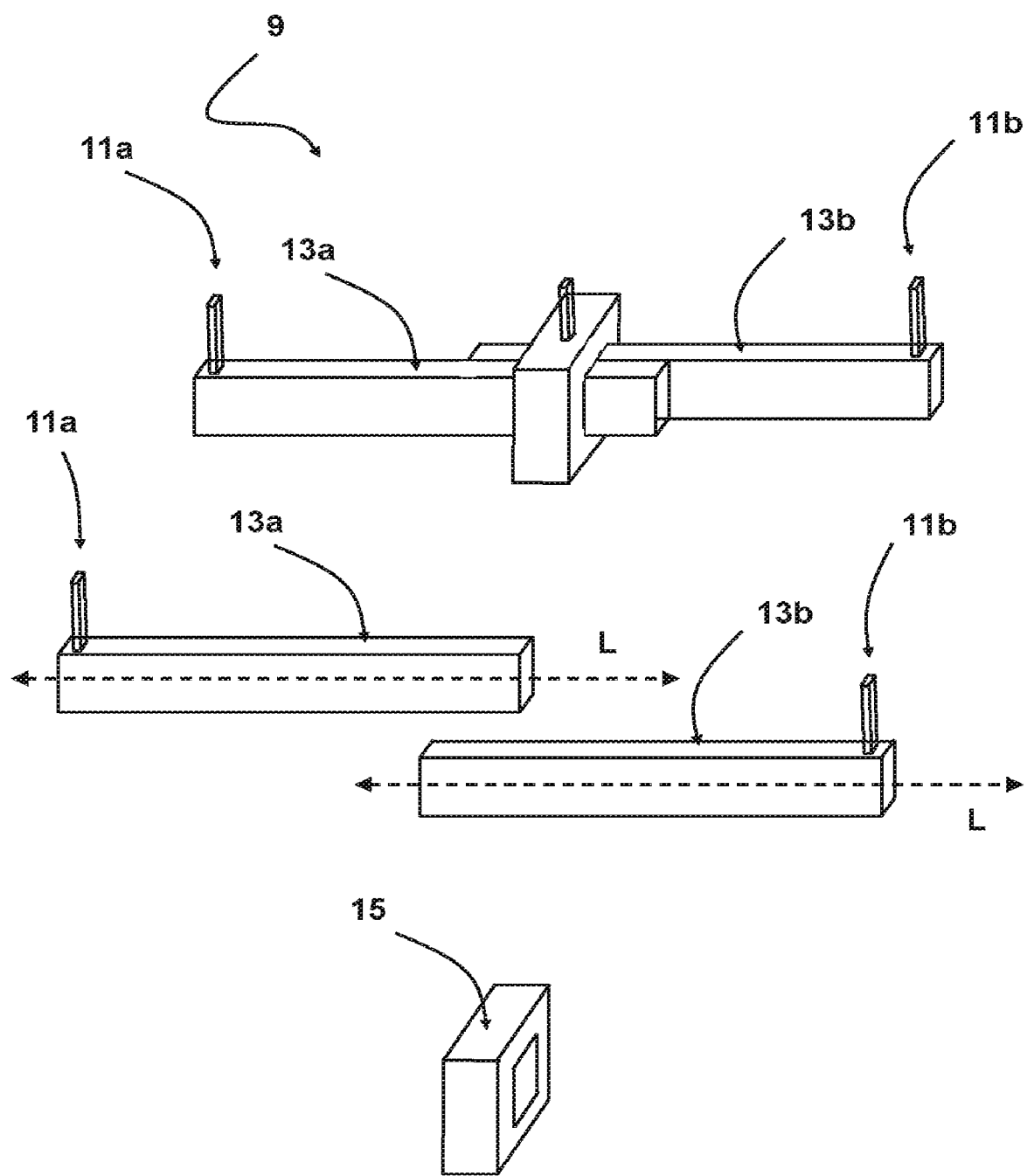
FIG. 4 shows a schematic diagram of an embodiment of an extendable connection member.

FIG. 4 shows a schematic diagram of an embodiment of an extendable connection member 9 configured to detachably connect at least two grid structure elements 5 with each other. The extendable connection member 9 comprises at least a first connection unit 11a and a second connection unit 11b, wherein the first and second connection units 11a, 11b are configured to be attachable to dedicated portions of the grid structure elements 5. In this exemplary embodiment, the extendable connection member 9 comprises a first beam 13a on which the first connection unit 11a is arranged and a second beam 13b on which the second connection unit 11b is arranged, the first and second connection units 11a, 11b detachably connectable to the grid structure elements 5, wherein the extendable connection member comprises a sliding guiding member 15 which is arranged to enable sliding of the first and second beams 13a, 13b with respect to each other in a longitudinal direction L thereof.

Optionally, the sliding guiding member 15 comprises a third connection unit detachably connectable to the grid structure elements 5. However, this is not shown in this example. The third connection unit may be similar to the first and second connection units 11a, 11b.

The extendable connection members 9 of the extension system may have various coupling mechanisms for coupling to the grid structure elements 5 together. In advantageous embodiments, a snap-fit connection is used. However, additionally or alternatively, it is possible to employ other mechanisms for achieving a detachable connection.

Figure 5:
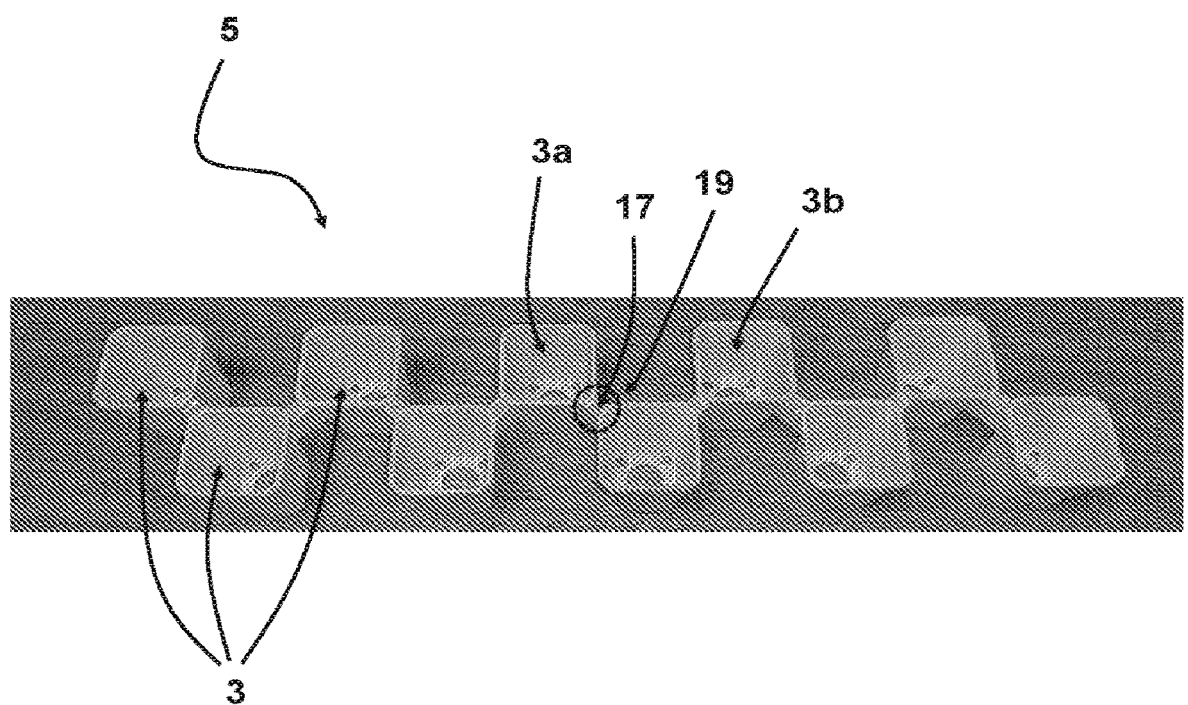
FIG. 5 shows a schematic diagram of an embodiment of a grid structure member.

FIG. 5 shows a schematic diagram of an embodiment of a grid structure element 5. The grid structure elements 5 of the assembly 1 may be provided with protrusions or slots for engaging with respective slots or protrusions in or on the extendable connection members 9.

In the shown example, each grid structure elements 5 comprises a plurality of slots 17 to which the extendable connection members 9 is attachable. The extendable members 9 are attachable to the grid structure elements 5 by pushing interlocking components together in the slots 17 of the grid structure elements 5. The plurality of slots 17 are positioned between adjacent plant holders 3 arranged on the grid structure elements 5. The grid structure element 5 can hold a plurality of plant holders in various ways. In the shown example of FIG. 5, the plurality of slots 17 are arranged between coupling pieces or connected portions 19 of adjacent plant holders 3a, 3b arranged on the grid structure elements 5. The extendable connection members are attachable to the grid structure elements at the coupling pieces 19 in an advantageous way. Additionally or alternatively, the grid structure element 5 may include a rib to which the plurality of plant holders are arranged in a staggered manner (not shown). Here, the coupling pieces 19 comprise slots, but other embodiments of a coupling piece can be possible as well.

Each plant holder 3 may have a hollow opening in which a plant can be housed, wherein leaves of the plant may be allowed to exit an upper portion of the hollow opening. The bottom surface of the plant holder may have one or more holes allowing air/water to reach the roots of the plant from the bottom.

The extendable plant tray assembly 1 may comprise a series of grid structure elements 5 (cf. columns) each with a set of plant holders 3. Each grid structure element may comprise a plurality of plant holders arranged in a staggered formation in a column (zigzag arrangement). The series of grid structure elements are movably connected with respect to each other by means of detachable extendable connection members, such that they can be moved relative to each other between at least a first position in which they are relatively close to each other, preferably touching each other (i.e. retracted position), and a second position, in which they are placed further apart than in the first position (i.e. extended position). Optionally, the plant holders are disposed such that the plant holders are evenly distributed in the extended position. Optionally, in the extended position, empty spaces are evenly distributed between the plant holders.

In some examples, the extendable connection members 9 provide a telescopic linkage between the at least two grid structure elements, adapted to vary the spacing between said at least two grid structure elements.

Figure 6:
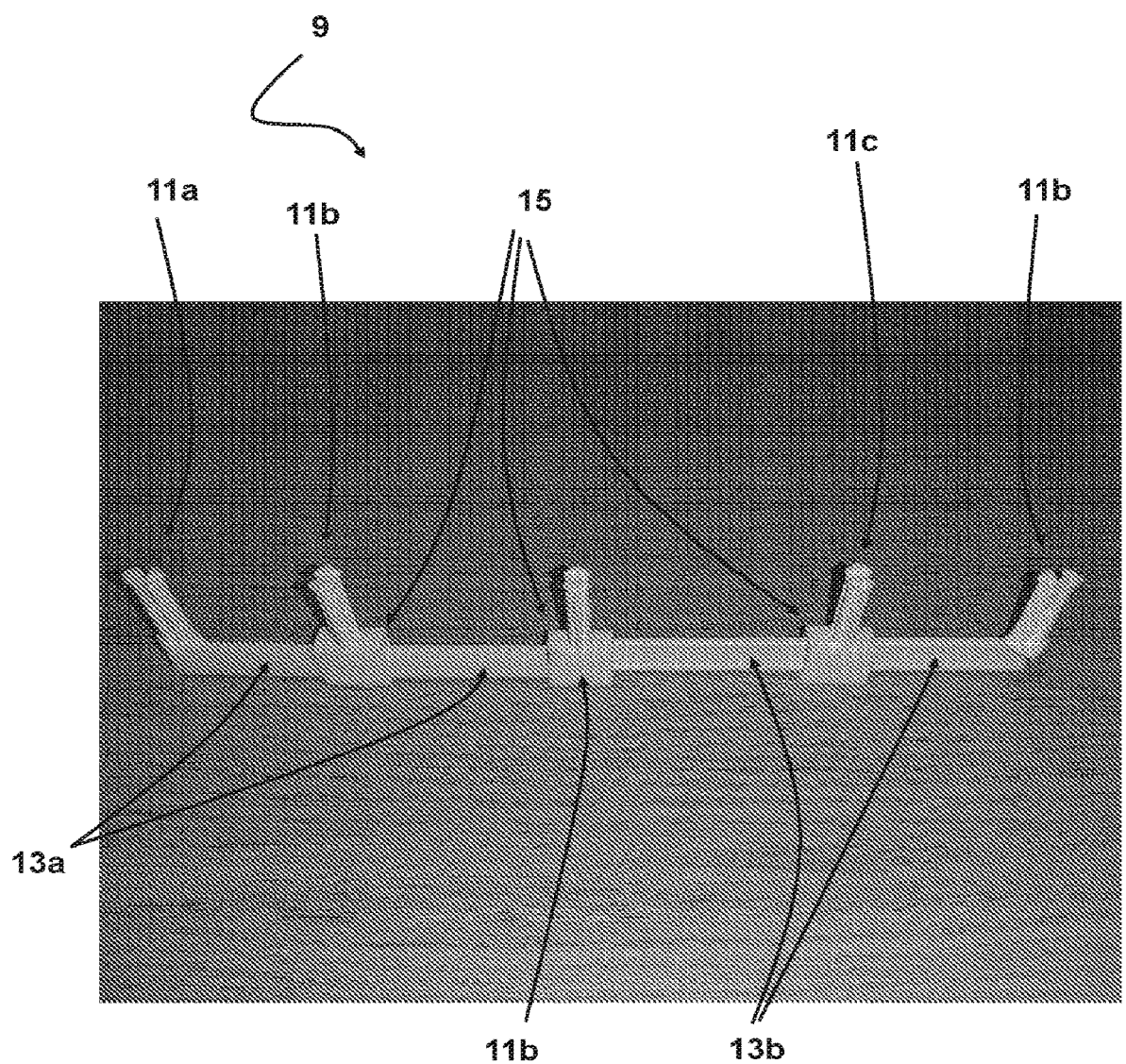
FIG. 6 shows a schematic diagram of an embodiment of an extendable connection member.

FIG. 6 shows a schematic diagram of an embodiment of an extendable connection member 9 arranged to provide a detachable connection between at least two grid structure elements 5. In this example, the extendable connection member has five connection units 11a-11e which are configured to be attachable to dedicated portions of the grid structure elements 5. In this example, the dedicated portions are slots. In this example, the extendable connection member 9 comprises a first beam 13a on which the first connection unit 11a is arranged and a second beam 13b on which the second connection unit 11b is arranged, the first and second connection units 11a, 11b detachably connectable to the grid structure elements 5 (through the slots). Furthermore, in this example, the extendable connection member 9 comprises three sliding guiding members 15 which are arranged to enable sliding of the first and second beams 13a, 13b with respect to each other in a longitudinal direction thereof. Each sliding guiding member 15 comprises one connection unit 11c, 11d, 11e detachably connectable to the grid structure elements 5.

The extendable connection member may have at least at least two parallel beams, wherein the beams are interconnected by at least one sliding guiding member so as to enable a sliding displacement along the longitudinal direction of the beams. In this way, a variable distance between the grid structure elements can be obtained.

Figure 7:
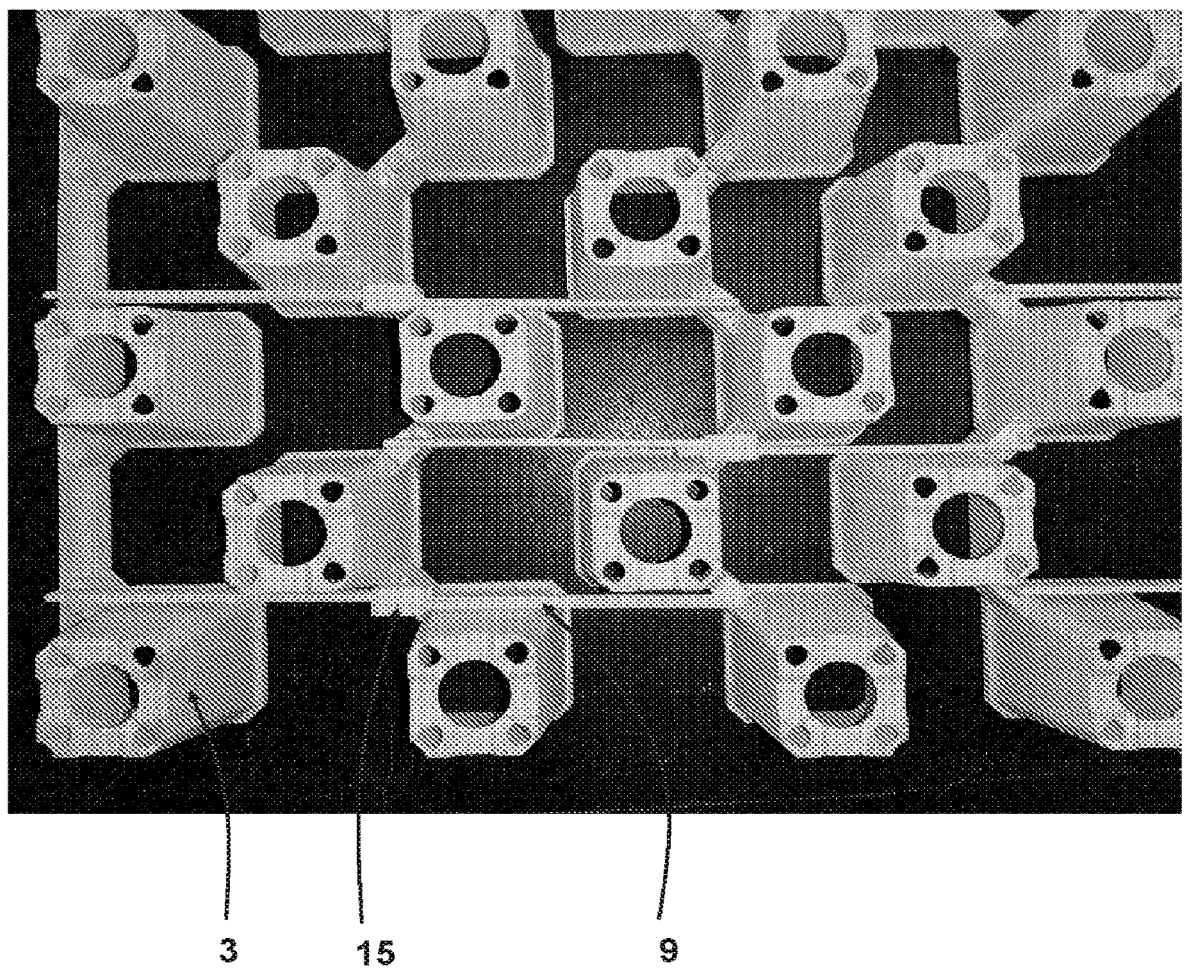
FIG. 7 shows a schematic diagram of an embodiment of an assembly.

FIG. 7 shows a schematic diagram of a bottom view an embodiment of an assembly 1. The assembly 1 is in the extended position. The extendable connection members 9 are detachably connected to the grid structure elements 5 from a bottom side. The extendable connection members 9 have connection units detachably receivable in dedicated slots of the grid structure elements 5. The slots are arranged at connecting portions between the plant holders. In this example, each extendable connection member has three connection units 11. However, other extendable connection members 9 with a different number of connection units are also envisaged.

The assembly 1 enables in a more efficient design for effectively distributing plant holders 3 by simultaneously varying their mutual distances.

Figure 8:
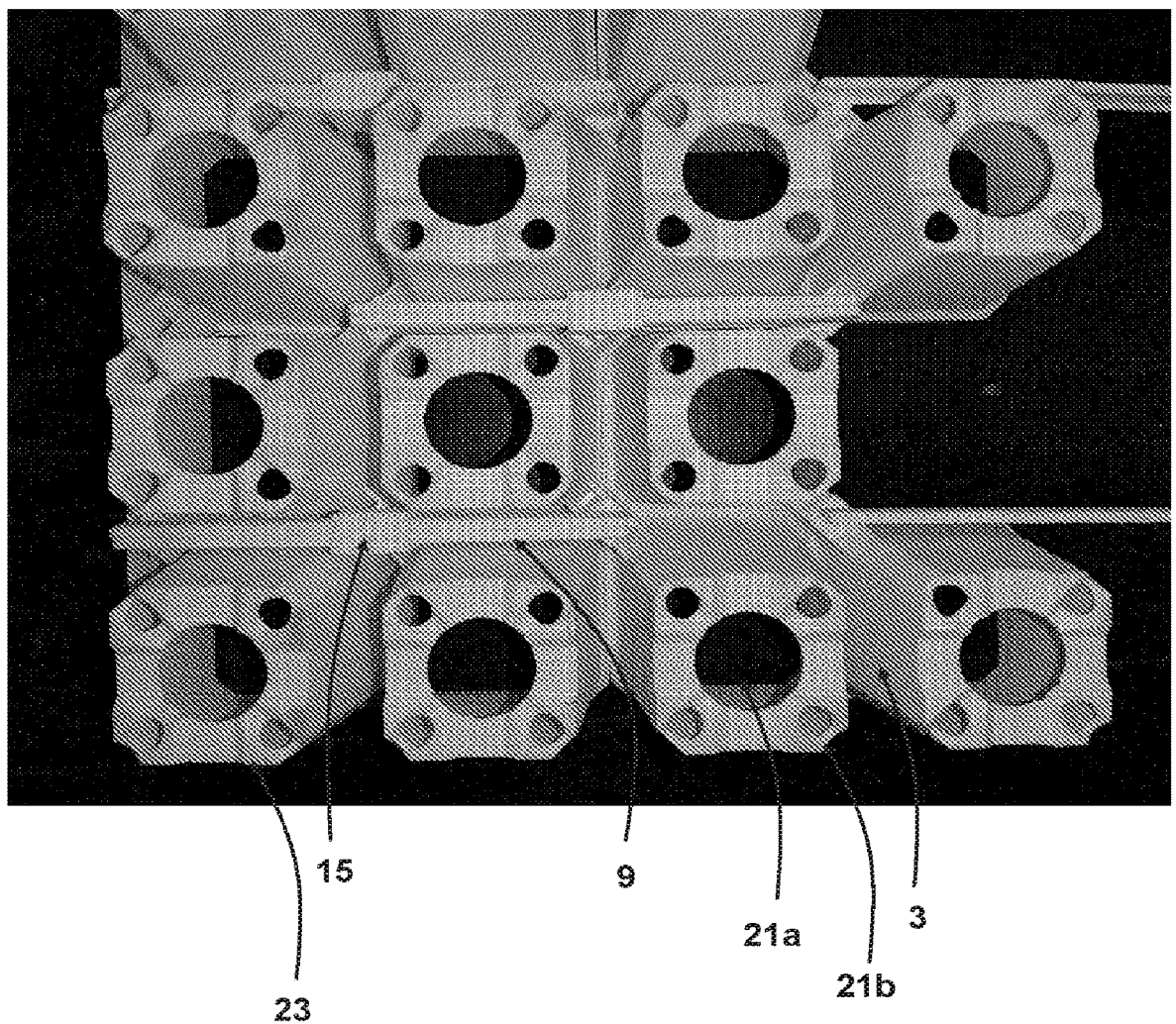
FIG. 8 shows a schematic diagram of an embodiment of an assembly.

FIG. 8 shows a schematic diagram of a bottom view of an embodiment of an assembly 1, similar to the embodiment shown in FIG. 7. The assembly 1 is in the retracted position.

The extension system may provide for a displacement mechanism with operating extendable connection members for displacing the grid structure elements relative to each other from a retracted position, in which the plant holders are placed as close as possible with respect to each other, to an extended position, in which the plant holders of the grid structure elements are distanced from each other. In the retracted position, the plant holders may be positioned adjacent to each other, without empty spaces therebetween, whereas in the extended position, the plant holders may have empty spaces therebetween. Each empty space may correspond to the dimensions of one plant holder. However, in some examples, the extended position may further increase the distance, making the empty space larger than the dimensions of one plant holder.

In the shown example, the plant holders 3 include a bottom surface with holes 21. Furthermore, the bottom surface comprises protrusions 23 to lift the bottom surface in order to allow water and/or air to access the at least one hole. The plant holder 3 includes a larger central hole 21a on the bottom surface, surrounded by four smaller holes 21b at the edges of the bottom surface of the plant holder 3.

Figure 9:
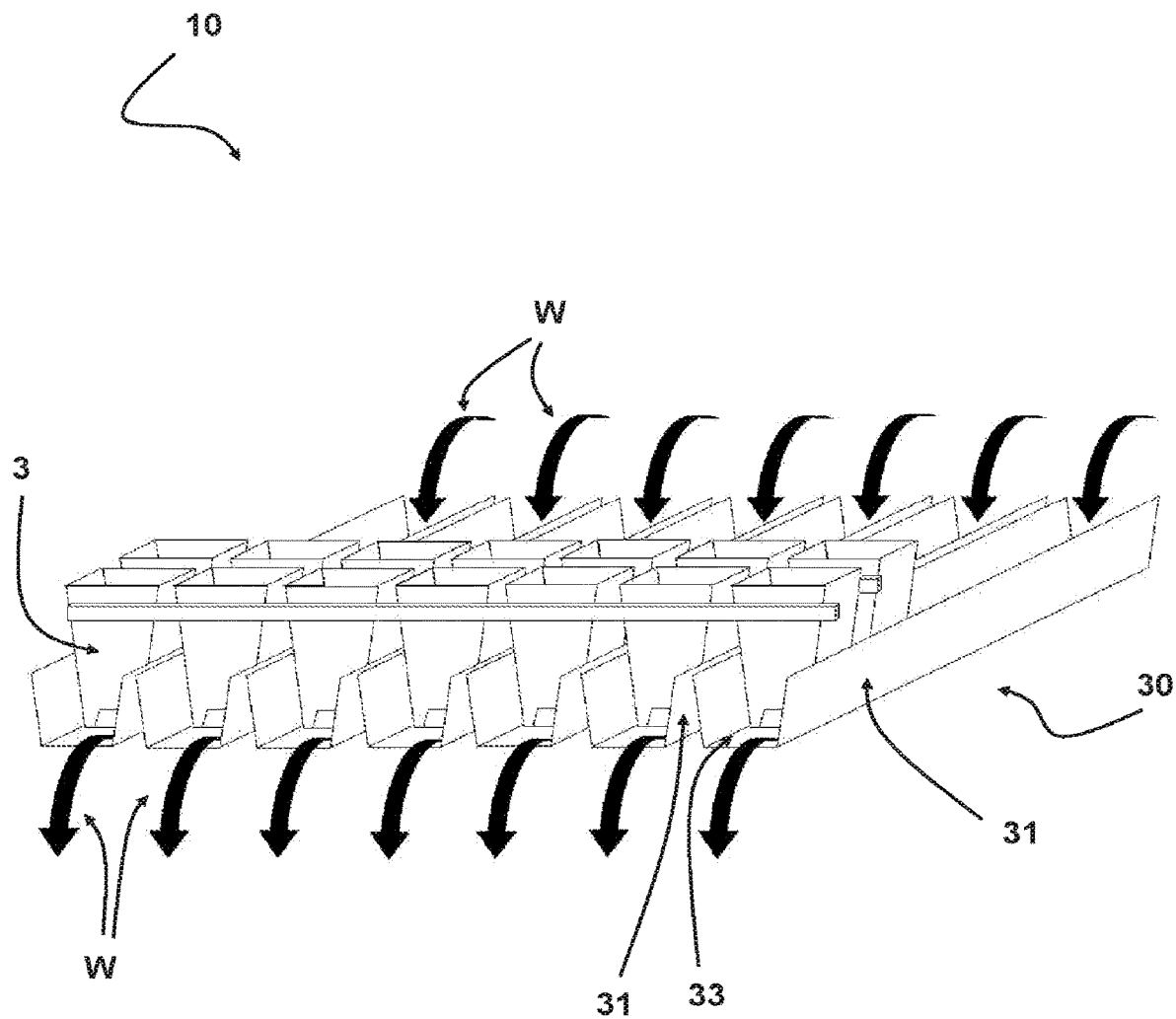
FIG. 9 shows a schematic diagram of an embodiment of a system.

FIG. 9 shows a schematic diagram of an embodiment of a system 10. The system comprises an extendable plant tray assembly 1 comprising a plurality of plant holders 3 in a grid structure, wherein in a first direction A said plant holders are movably connected through an extension system arranged to move said assembly 1 between a retracted position and an extended position, the assembly including at least one grid structure element 5 holding a plurality of plant holders 3 in a second direction B transverse to said first direction A, wherein the plurality of plant holders 3 are arranged on the at least one grid structure element in a staggered manner, alternating a plant holder 3 with a plant holder receiving space 7, wherein the extension system comprises extendable connection members 9 which are configured to connect at least two grid structure elements 5, and wherein the extendable connection members 9 are detachably connected to said at least two grid structure elements 5. In the shown example, the assembly is in the retracted position. The system 10 further comprises a base 30 on which the extendable plant tray assembly 1 is placeable, wherein the base comprises a plurality of gutters 31 arranged in parallel next to each other extending in the first direction A.

The gutters 31 are sloping in order to allow the flow of water from one end to another end. The flow of water is indicated by arrows W. The assembly 1 and the gutters 31 of the system 10 may be configured and dimensioned such that the bottom surface of the plant holders 3 rest on the receiving surfaces 33 of the gutters 31. Optionally, the protrusions on the bottom surface of the plant holders rest on the receiving surfaces of the gutters.

In some examples, the grid structure elements are provided with slots, wherein the extendable connection members of the extension system are provided with upwardly directed protrusion formed such as to enter the slots for providing a detachable connection. The protrusions may be located at end portions of the extendable connection members.

Figure 10:
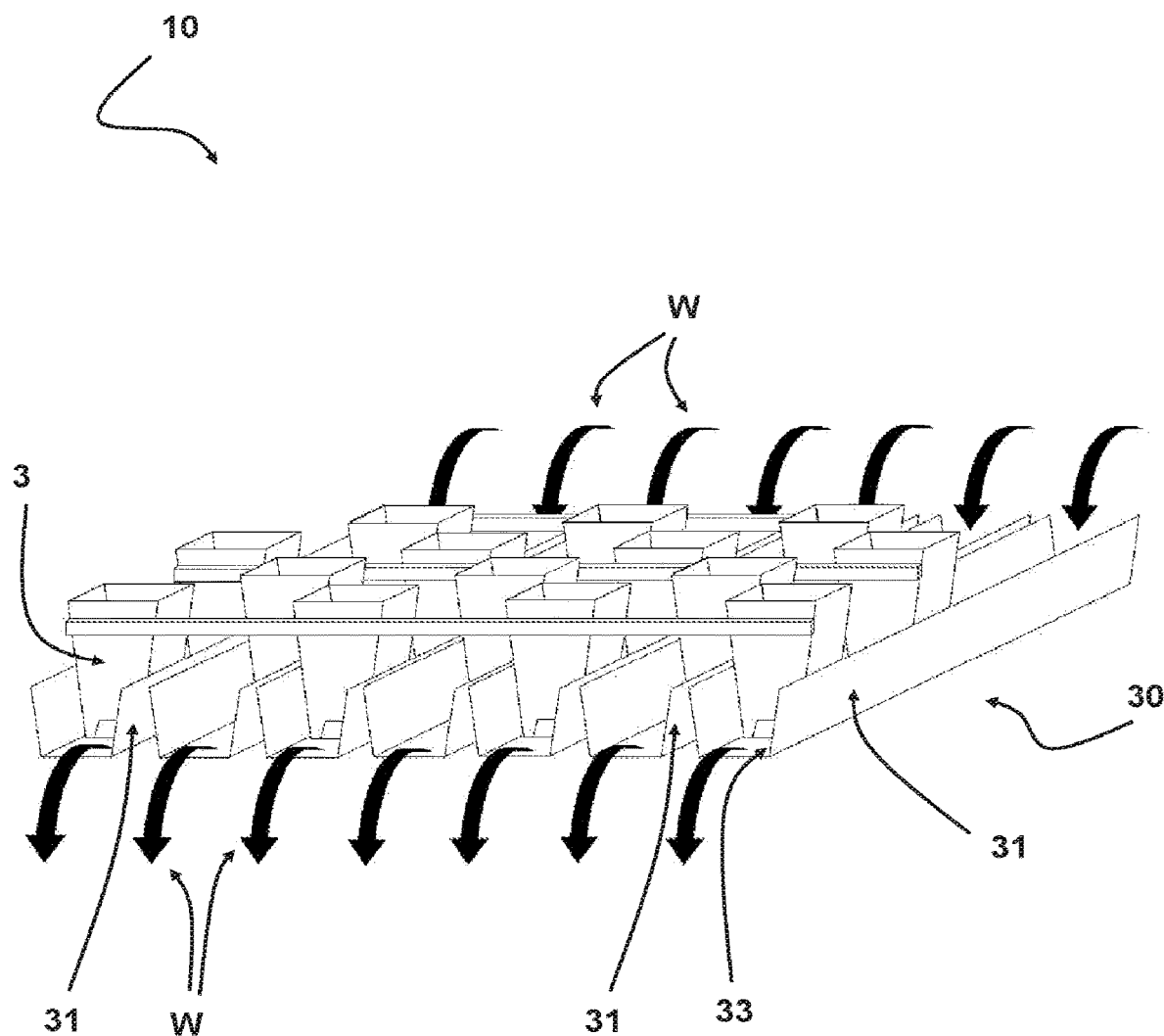
FIG. 10 shows a schematic diagram of an embodiment of a system.

FIG. 10 shows a schematic diagram of an embodiment of a system 1 similar to the example shown in FIG. 9. The assembly is in the extended position.

Figure 11A:
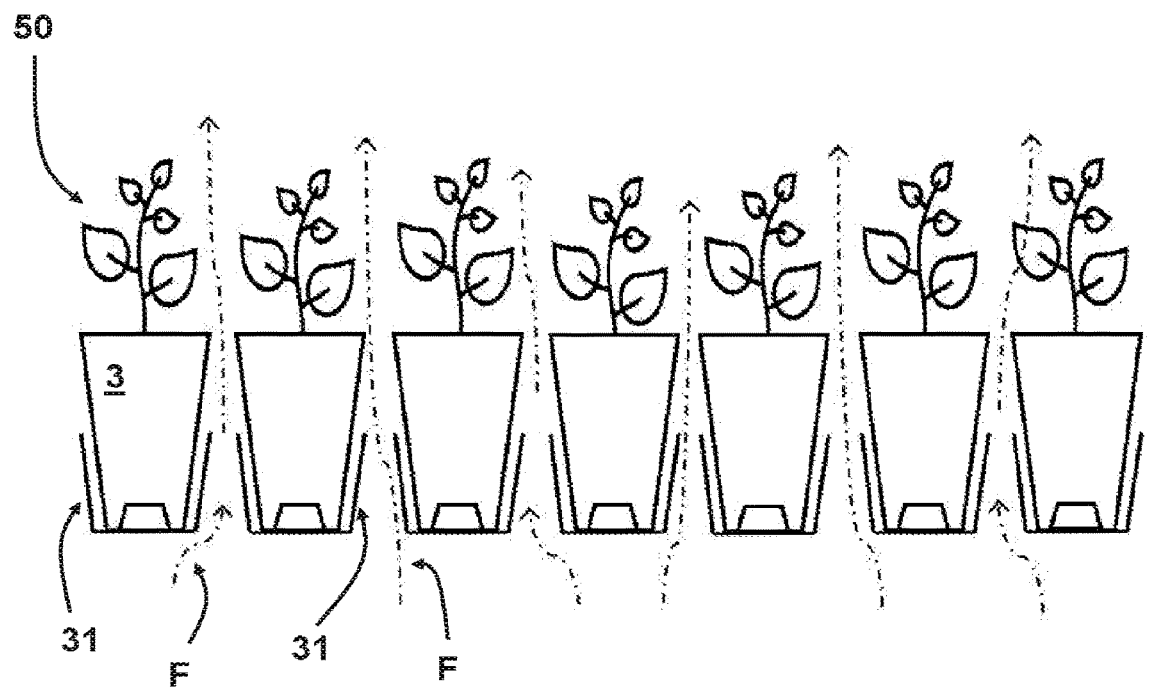
FIGS. 11A and 11B show a schematic diagram of an embodiment of a system.
Figure 11B:
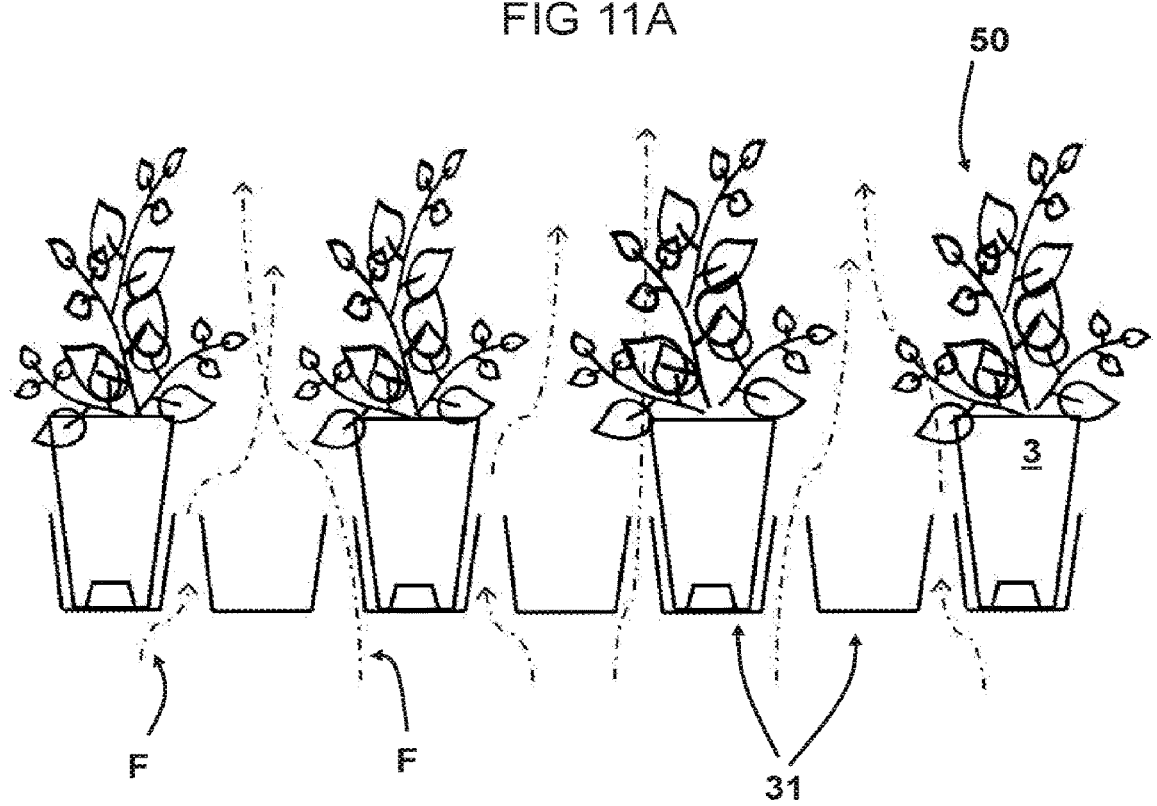

FIGS. 11A and 11B show a schematic diagram of a cross sectional side view of an embodiment of a system 10 comprising an extendable plant tray assembly 1 and a base with parallel gutters 31. In FIG. 11A the plants 50 held in the plant holders 3 are relatively small, whilst in FIG. 11B the plants 50 held in the plant holders 3 are relatively large. In FIG. 11A, the assembly 1 is in the retracted position. In FIG. 11B, the assembly 1 is in the extended position, resulting in empty spaces 7 provided between plant holders 3. The air flow is indicated by arrows F. In both cases air can flow along the gutters, reducing the risk of fungus formation.

Figure 12:
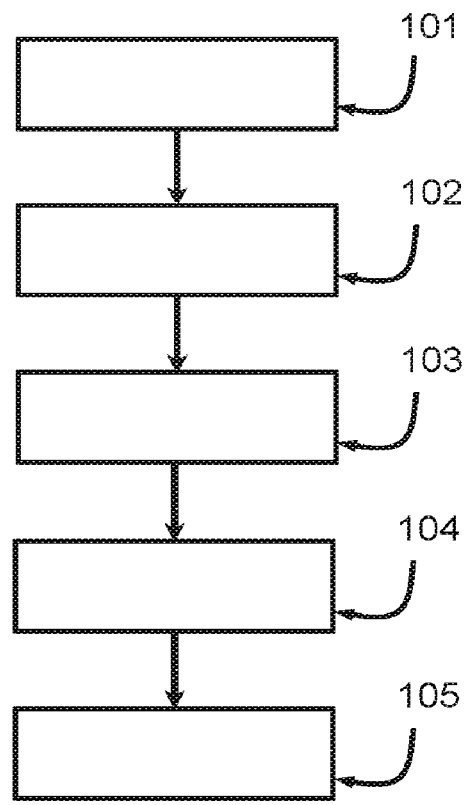
FIG. 12 shows a schematic diagram of a method.

FIG. 12 shows a schematic diagram of a method 100 for producing plants. In a first step 101, an extendable plant tray assembly is provided which comprises a plurality of plant holders (1) in a grid structure, wherein in a first direction (A) said plant holders (1) are movably connected through an extension system (8) arranged to move said assembly between a retracted position and an extended position, the assembly including at least one grid structure element (3) holding a plurality of plant holders in a second direction (B) transverse to said first direction (A), wherein the plurality of plant holders (1) are arranged on the at least one grid structure element in a staggered manner, alternating a plant holder (1) with a plant holder receiving space (5), wherein the extension system comprises extendable connection members which are configured to connect at least two grid structure elements (3), and wherein the extendable connection members are detachably connected to said at least two grid structure elements (3). In a second step 102, the plant pots are filled with medium, wherein a seed, seedling or plant is placed in the medium. In a third step 103, a base is provided on which the extendable plant tray is placeable, wherein the base comprises a plurality of gutters arranged in parallel next to each other extending in the first direction (A). In a fourth step 104, the extendable plant tray assembly in retracted position on said base. The base may for example comprise gutters, wherein air flow is forced flow along the plant holders in an upwards direction. In a fifth step 105, the extendable plant tray assembly is extended from the retracted position to its extended position based on the size of the plant. In some examples, air is blown via the gutters in order to provide ventilation for the plants. The plants may be harvested and the expendable plant tray may be emptied, cleaned and/or disinfected. The extendable plant tray may be returned to the in which the plant holders are refilled.

The extendable plant tray assembly may be a pull-out device with a plurality of plant holders, the device having an extension system such that the device is adjustable between a retracted position, in which the plant holders are positioned as close as possible to another, and an extended position, in which the distance between the plant holders is increased. The extension system may movably connect at least two grid structure elements together. The plurality of plant holders of each grid structure element may be zigzag mounted along the longitudinal direction of said each grid structure element, wherein a plant holder alternates with a plant holder receiving space.

Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

Spatially relative terms, such as "left", "right", "upwards", "downwards", "horizontal", "vertical", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms "first" and "second" are used herein to describe various components, regions, layers and/or sections, these regions, layers and/or sections should not be limited by these terms. These terms are only used to distinguish one component, region, layer or section from another component, region, layer or section. Thus, a first component, region, layer or section discussed below could be termed a second component, region, layer or section, and vice versa, without departing from the teachings of the present invention. Like numbers refer to like elements throughout.

Moreover, all details of the invention may be substituted with other technically equivalent elements and the materials used, as well as the shapes and dimensions of the various components, may vary according to requirements. Herein, the invention is described with reference to specific examples of embodiments of the invention. It will, however, be evident that various modifications, variations, alternatives and changes may be made therein, without departing from the essence of the invention. For the purpose of clarity and a concise description, features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

What is claimed is:

1. An extendable plant tray assembly comprising a plurality of plant holders in a grid structure, wherein in a first direction said plant holders are movably connected through an extension system arranged to move said assembly between a retracted position and an extended position, the assembly including at least two grid structure elements holding a plurality of plant holders in a second direction transverse to said first direction, wherein the plurality of plant holders are arranged on the grid structure elements in a staggered manner, alternating a plant holder with a plant holder receiving space, wherein the extension system comprises extendable connection members which are configured to connect the at least two grid structure elements, wherein the extendable connection members are detachably connected to said at least two grid structure elements, wherein each of the extendable connection members comprises at least a first beam, a second beam, and one or more sliding guiding members arranged to enable sliding of the first and second beams with respect to each other in a longitudinal direction thereof, and wherein, for each extendable connection member, at least a first connection unit and a second connection unit is arranged on respectively the first and the second beam, and wherein the first and second connection units are configured to be detachably connectable to dedicated portions of the grid structure elements by snap-fitting.

2. The extendable plant tray assembly according to claim 1, wherein each grid structure elements comprises a plurality of slots to which one end of the extendable connection members is attachable.

3. The extendable plant tray assembly according to claim 1, wherein the extension system is a slidable extension system.

4. The extendable plant tray assembly according to claim 1, wherein the slidable extension system comprises at least one telescopically extendable rod connecting at least two grid structure elements.

5. The extendable plant tray assembly according to claim 1, wherein the plant holders have sloping walls.

6. The extendable plant tray assembly according to claim 1, wherein the plant holders are tapered towards the bottom side.

7. The extendable plant tray assembly according to claim 1, wherein a distance between diagonally adjacent plant holders remains unchanged between said retracted position and said extended position of said assembly.

8. The extendable plant tray assembly according to claim 1, wherein the plant holder includes a bottom surface, with at least one hole.

9. The extendable plant tray assembly according to claim 8, wherein the bottom surface comprises one or more protrusions to lift the bottom surface in order to allow water and/or air to access the at least one hole.

10. The extendable plant tray assembly according to claim 1, wherein said grid structure element and/or said grid structure end element are modular elements, to which a desired number of plant holders is mountable.

11. The extendable plant tray assembly according to claim 1, wherein the dedicated portions of the grid structure elements are at least one of the group consisting of: slots, holes, or protrusions.

12. A method of making a plant tray assembly extendable in a first direction, the method comprising:
providing a plurality of plant holders in a grid structure, wherein at least one grid structure element is provided which is configured to hold a plurality of plant holders in a second direction transverse to said first direction, wherein the plurality of plant holders are arranged on the at least one grid structure element in a staggered manner, alternating a plant holder with a plant holder receiving space,
providing an extension system configured to enable movement of the plant tray assembly in the first direction between a retracted position and an extended position, the assembly, and
connecting at least two grid structure elements with an extendable connection member, the extendable connection member being detachably connected to the at least two grid structure elements;
wherein the extendable connection member comprises at least a first beam, a second beam, and one or more sliding guiding members arranged to enable sliding of the first and second beams with respect to each other in a longitudinal direction thereof, and wherein, for the extendable connection member, at least a first connection unit and a second connection unit is arranged on respectively the first and the second beam, and wherein the first and second connection units are configured to be detachably connectable to dedicated portions of the grid structure elements by snap-fitting.

13. The method according to claim 12, wherein the size of the plant tray assembly is expanded or reduced by changing the number of grid structure elements used, and wherein the connection between grid structure elements is correspondingly adjusted using the detachable extendable connection members.

14. A plant tray system comprising:
an extendable plant tray assembly comprising a plurality of plant holders in a grid structure, wherein in a first direction said plant holders are movably connected through an extension system arranged to move said assembly between a retracted position and an extended position, the assembly including at least one grid structure element holding a plurality of plant holders in a second direction transverse to said first direction, wherein the plurality of plant holders are arranged on the at least one grid structure element in a staggered manner, alternating a plant holder with a plant holder receiving space, wherein the extension system comprises extendable connection members which are configured to connect at least two grid structure elements, wherein the extendable connection members are detachably connected to said at least two grid structure elements, wherein each of the extendable connection members comprises at least a first beam, a second beam, and one or more sliding guiding members arranged to enable sliding of the first and second beams with respect to each other in a longitudinal direction thereof, and wherein, for each extendable connection member, at least a first connection unit and a second connection unit is arranged on respectively the first and the second beam, and wherein the first and second connection units are configured to be detachably connectable to dedicated portions of the grid structure elements by snap-fitting; and a base on which the extendable plant tray assembly is placeable, wherein the base comprises a plurality of gutters arranged in parallel next to each other extending in the first direction.

15. The plant tray system according to claim 14, wherein the gutters are sloping in order to allow the flow of water from one end to another end.

16. The plant tray system according to claim 14, wherein the plant tray system further includes a ventilation unit, configured to blow air through the gutters.

17. A grid structure element for an extendable plant tray assembly according to claim 1, the grid structure element arranged to hold a plurality of plant holders in a staggered manner, alternating a plant holder with a plant holder receiving space, wherein between each adjacent plant holder a slot is arranged to which one end of an extendable connection member is attachable.

18. A grid structure end element for an extendable plant tray assembly according to claim 1, the grid structure arranged to hold a plurality of plant holders only at a single side, alternating a plant holder with a plant holder receiving space, wherein between each adjacent plant holder a slot is arranged to which one end of an extendable connection member is attachable.

19. An extendable connection member comprising at least a first connection unit and a second connection unit, wherein the first and second connection units are configured to be attachable to dedicated portions of a grid structure element according to claim 17.

20. A method for producing plants, the method comprising:

providing an extendable plant tray assembly comprising a plurality of plant holders in a grid structure, wherein in a first direction said plant holders are movably connected through an extension system arranged to move said assembly between a retracted position and an extended position, the assembly including at least one grid structure element holding a plurality of plant holders in a second direction transverse to said first direction, wherein the plurality of plant holders are arranged on the at least one grid structure element in a staggered manner, alternating a plant holder with a plant holder receiving space, wherein the extension system comprises extendable connection members which are configured to connect at least two grid structure elements, wherein the extendable connection members are detachably connected to said at least two grid structure elements, wherein the extendable connection member comprises at least a first beam, a second beam, and one or more sliding guiding members arranged to enable sliding of the first and second beams with respect to each other in a longitudinal direction thereof, and wherein, for the extendable connection member, at least a first connection unit and a second connection unit is arranged on respectively the first and the second beam, and wherein the first and second connection units are configured to be detachably connectable to dedicated portions of the grid structure elements by snap-fitting;

filling the plant pots with medium, wherein a seed, seedling or plant is placed in the medium;

providing a base on which the extendable plant tray assembly is placeable, wherein the base comprises a plurality of gutters arranged in parallel next to each other extending in the first direction;

placing the extendable plant tray assembly in retracted position on said base; and extending the extendable plant tray assembly from the retracted position to its extended position based on a size of the plants.

21. The method according to claim 20, wherein the base comprises gutters and wherein water is provided via the gutters.

22. The method according to claim 21, wherein ventilation for the plants is provided by blowing air between the plant holders in an upward direction along the plant holders.

* * * * *